United States Patent
Wu

(10) Patent No.: US 10,397,524 B1
(45) Date of Patent: Aug. 27, 2019

(54) THREE-DIMENSIONAL AROUND VIEW MONITORING SYSTEM OF VEHICLE AND METHOD THEREOF

(71) Applicant: SarMo Technology Inc., Taipei (TW)

(72) Inventor: Yi-Tsung Wu, Taipei (TW)

(73) Assignee: UL See Inc., Tortola (VG)

( * ) Notice: Subject to any disclaimer, the term of this patent is extended or adjusted under 35 U.S.C. 154(b) by 281 days.

(21) Appl. No.: 15/587,885

(22) Filed: May 5, 2017

(30) Foreign Application Priority Data

May 18, 2016 (TW) .............................. 105115298 A

(51) Int. Cl.
*B60R 11/04* (2006.01)
*H04N 7/18* (2006.01)
(Continued)

(52) U.S. Cl.
CPC ............. *H04N 7/181* (2013.01); *B60R 11/04* (2013.01); *G08B 13/19628* (2013.01); *B60R 2300/105* (2013.01); *G06T 2207/30252* (2013.01)

(58) Field of Classification Search
CPC .. H04N 7/181; B60R 11/04; G08B 13/19628; G60R 2300/105; G06T 2207/30252; G06T 5/00; G06T 5/50; G06T 7/00; G06T 3/40
(Continued)

(56) References Cited

U.S. PATENT DOCUMENTS

| 7,714,936 | B1 * | 5/2010 | Martin | G06T 3/0018 348/576 |
| 2008/0129723 | A1 * | 6/2008 | Comer | G06T 3/0018 345/419 |

(Continued)

FOREIGN PATENT DOCUMENTS

| CN | 101442618 | 5/2009 |
| CN | 103150715 | 6/2013 |

(Continued)

OTHER PUBLICATIONS

Search Report for Taiwan Patent Application No. 105115298 and translation. Date of completion: Dec. 20, 2016.

*Primary Examiner* — Nathan J Flynn
*Assistant Examiner* — Caroline Somera
(74) *Attorney, Agent, or Firm* — Alan D. Kamrath; Mayer & Williams PC

(57) ABSTRACT

A three-dimensional around view monitoring system of a vehicle includes a fisheye image correction setting module, configured to receive fisheye image data generated by photographing a correction plate; correct the fisheye image data into corrected image data to generate a fisheye correction lookup table and rotate and translate radiate vertical reference lines presented as straight lines in the corrected image data in a neighborhood into overlaps having a same radiation angle to generate a rotation and translation lookup table; and a static three-dimensional stitched image generation module, configured to generate a stitched image lookup table according- (Continued)

ing to the rotation and translation lookup table and the fisheye correction lookup table, calculate a pixel value of each pixel in the corrected image data by using a pixel value of each pixel in fisheye image data, and perform image stitching on the neighboring corrected image data to generate static stitched image data.

10 Claims, 12 Drawing Sheets

(51) Int. Cl.
    *G08B 13/196*      (2006.01)
    *G06T 5/00*      (2006.01)
    *G06T 5/50*      (2006.01)
    *G06T 7/00*      (2017.01)
    *G06T 3/40*      (2006.01)

(58) Field of Classification Search
    USPC ............................................... 348/148
    See application file for complete search history.

(56) References Cited

U.S. PATENT DOCUMENTS

| | | | |
|---|---|---|---|
| 2008/0174659 A1* | 7/2008 | McDowall | H04N 5/265 348/53 |
| 2009/0002394 A1 | 1/2009 | Chen et al. | |
| 2010/0208032 A1* | 8/2010 | Kweon | G03B 37/00 348/36 |
| 2015/0062292 A1* | 3/2015 | Kweon | H04N 5/23238 348/37 |
| 2015/0254825 A1* | 9/2015 | Zhang | B60R 1/00 382/284 |
| 2015/0302561 A1* | 10/2015 | Pekkucuksen | G06T 5/006 382/275 |
| 2016/0048973 A1* | 2/2016 | Takenaka | G06T 3/4038 382/199 |
| 2016/0330376 A1* | 11/2016 | Debevec | H04N 13/204 |
| 2017/0324943 A1* | 11/2017 | Wu | H04N 7/181 |

FOREIGN PATENT DOCUMENTS

| | | |
|---|---|---|
| CN | 104966062 | 10/2015 |
| TW | 201226237 | 7/2012 |

* cited by examiner

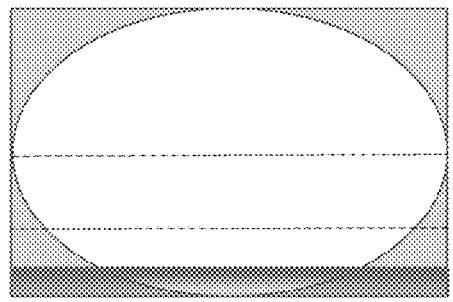
FIG. 2A
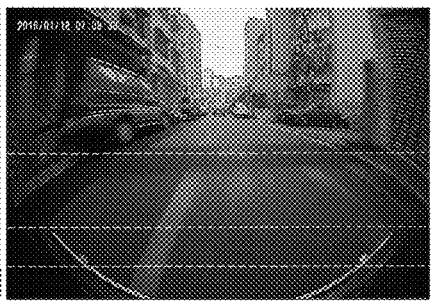
FIG. 2B
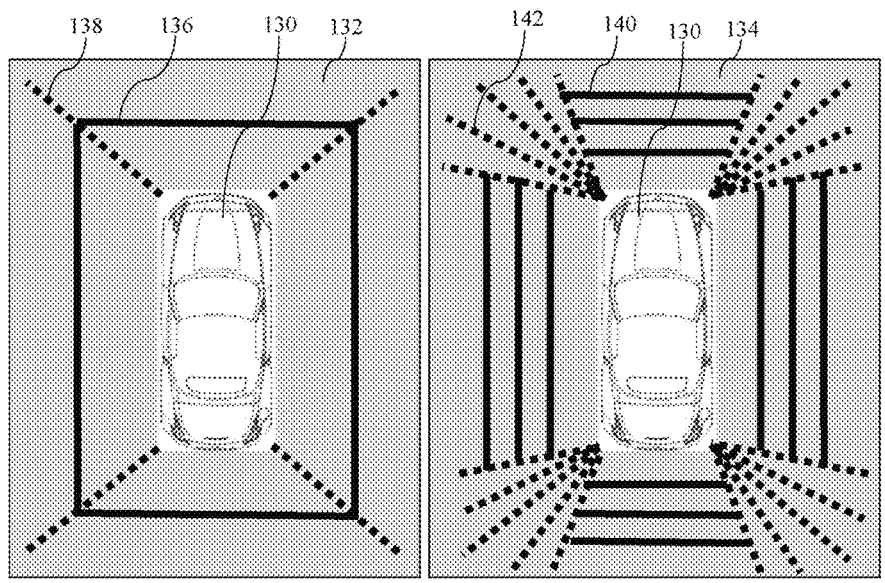
FIG. 3A
FIG. 3B

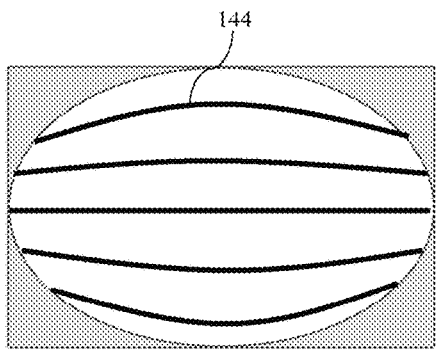
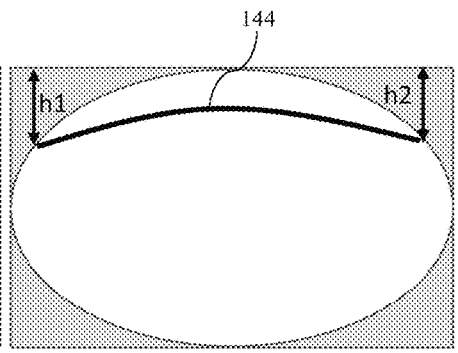
FIG. 4A  FIG. 4B
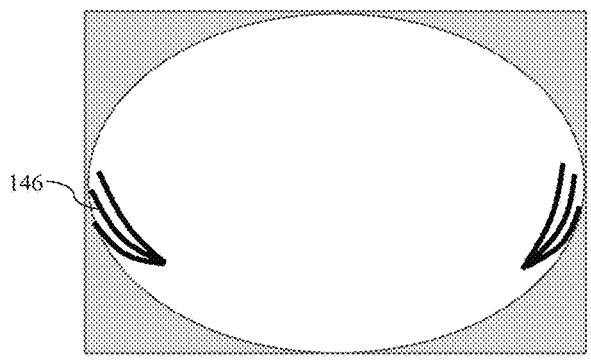
FIG. 5

THREE-DIMENSIONAL AROUND VIEW MONITORING SYSTEM OF VEHICLE AND METHOD THEREOF

BACKGROUND

Technical Field

The present invention relates to the field of vehicles and in particular, to a three-dimensional around view monitoring system of a vehicle and a method thereof.

Related Art

A conventional "Around View Monitoring (AVM) system" presents a result of stitching short-distance (3 to 5 meters) images of four sides, namely, the front, rear, left, and right sides, of a vehicle in a 2D manner by means of image stitching to help a driver know situations around the vehicle, so as to prevent damaging articles around the vehicle. Such a presenting manner (2D-AVM) enables the around view monitoring system to be used only when the vehicle runs at a low speed.

To remedy this disadvantage, recently, there are manufacturers that perform development toward a three-dimensional around view monitoring (3D-AVM) system. However, a conventional 3D-AVM still has some disadvantages: for example, some blind angles of stitching would be generated during image stitching, in other words, an article that actually appears around a vehicle disappears in a region where images are stitched, or during image stitching of a conventional 3D-AVM, a situation that an article repeatedly appears would take place, and a situation that an image repeatedly appears is more obvious at a place that is farther.

SUMMARY

In view of the foregoing problems, an objective of the present invention is to provide a three-dimensional around view monitoring system of a vehicle and a method thereof, where the three-dimensional around view monitoring system reduces generation of a stitching blind angle during image stitching, so that an article that actually appears around the vehicle would not disappear at a region where images are stitched, and a situation that an article repeatedly appears would not take place.

A first manner of the present invention provides a three-dimensional around view monitoring method of a vehicle, including the following steps:

receiving a plurality of pieces of fisheye image data generated by photographing a correction plate, where the correction plate includes a plurality of horizontal reference lines presented as straight lines and a plurality of radiate vertical reference lines presented as straight lines, and the horizontal reference lines and the radiate vertical reference lines are presented as circular arc lines in the pieces of fisheye image data;

correcting the pieces of fisheye image data including the horizontal reference lines presented as circular arc lines and the radiate vertical reference lines presented as circular arc lines into a plurality of pieces of corrected image data including the horizontal reference lines presented as straight lines and the radiate vertical reference lines presented as straight lines to generate a fisheye correction lookup table, and acquiring a coordinate position of each pixel, corresponding to each pixel in the pieces of fisheye image data, in the pieces of corrected image data according to the fisheye correction lookup table;

rotating and translating the radiate vertical reference lines presented as straight lines in the pieces of corrected image data in a neighborhood into overlaps having a same radiation angle to generate a rotation and translation lookup table and acquiring, according to the rotation and translation lookup table and the fisheye correction lookup table, a coordinate position of each pixel, corresponding to each pixel in the pieces of fisheye image data, in the pieces of corrected image data that have been rotated and translated; and generating a stitched image lookup table according to the rotation and translation lookup table and the fisheye correction lookup table, acquiring, according to the stitched image lookup table, a coordinate position of each pixel, corresponding to each pixel in the pieces of fisheye image data, in the pieces of corrected image data, calculating a pixel value of each pixel in the pieces of corrected image data by using the pixel value of each pixel in the pieces of fisheye image data, and performing image stitching on the neighboring pieces of corrected image data to generate a piece of static stitched image data.

A second manner of the present invention provides a three-dimensional around view monitoring system of a vehicle, including:

a fisheye image correction setting module, configured to receiving a plurality of pieces of fisheye image data generated by photographing a correction plate, correct the pieces of fisheye image data including a plurality of horizontal reference lines presented as circular arc lines and a plurality of radiate vertical reference lines presented as circular arc lines into a plurality of pieces of corrected image data including the horizontal reference lines presented as straight lines and the radiate vertical reference lines presented as straight lines to generate a fisheye correction lookup table, rotate and translate the radiate vertical reference lines presented as straight lines in the pieces of corrected image data in a neighborhood into overlaps having a same radiation angle to generate a rotation and translation lookup table, where the correction plate includes the horizontal reference lines presented as straight lines and the radiate vertical reference lines presented as straight lines, and the horizontal reference lines and the radiate vertical reference lines are presented as circular arc lines in the pieces of fisheye image data, acquire a coordinate position of each pixel, corresponding to each pixel in the pieces of fisheye image data, in the pieces of corrected image data according to the fisheye correction lookup table, and acquire, according to the rotation and translation lookup table and the fisheye correction lookup table, a coordinate position of each pixel, corresponding to each pixel in the pieces of fisheye image data, in the pieces of corrected image data that have been rotated and translated; and a static three-dimensional stitched image generation module, configured to generate a stitched image lookup table according to the rotation and translation lookup table and the fisheye correction lookup table, calculate a pixel value of each pixel in the pieces of corrected image data by using the pixel value of each pixel in the pieces of fisheye image data, and perform image stitching on the neighboring pieces of corrected image data to generate a piece of static stitched image data, where a coordinate position of each pixel, corresponding to each pixel in the pieces of fisheye image data, in the pieces of corrected image data is acquired according to the stitched image lookup table.

BRIEF DESCRIPTION OF THE DRAWINGS

FIG. 2A is a schematic diagram of a photographing angle of a fisheye lens of the present invention;

FIG. 2B is an icon of a photographed image of a fisheye lens of the present invention;

FIG. 3A and FIG. 3B are schematic diagrams of a correction plate of the present invention;

FIG. 4A is a schematic diagram of a fisheye image of horizontal reference lines of the present invention;

FIG. 4B is a schematic diagram of one horizontal reference line among the multiple horizontal reference lines of FIG. 4A;

FIG. 5 is a schematic diagram of a fisheye image of radiate vertical reference lines of the present invention;

DETAILED DESCRIPTION

In order to enable persons of ordinary skill in the art of the present invention to further understand the present invention, preferred embodiments of the present invention are specifically provided in the following text and the constitution content and to-be-produced effects of the present invention are described in detail with reference to the accompanying drawings.

Figure 1:
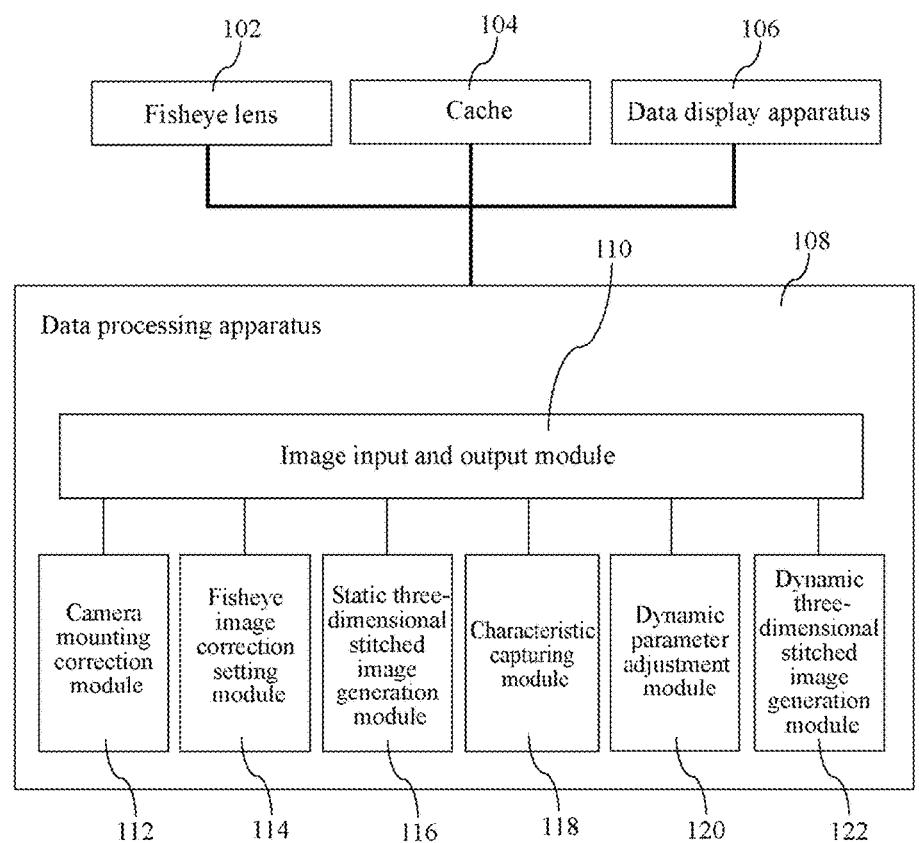
FIG. 1 is a block diagram of a three-dimensional around view monitoring system of a vehicle of the present invention.

FIG. 1 is a block diagram of a three-dimensional around view monitoring system of a vehicle of the present invention. In FIG. 1, a three-dimensional around view monitoring system 100 includes multiple fisheye lenses 102, a cache 104, a data display apparatus 106, and a data processing apparatus 108. The data processing apparatus 108 includes an image input and output module 110, a camera mounting correction module 112, a fisheye image correction setting module 114, a static three-dimensional stitched image generation module 116, a characteristic capturing module 118, a dynamic parameter adjustment module 120, and a dynamic three-dimensional stitched image generation module 122.

In this embodiment, the fisheye lenses 102 are respectively mounted on the front, rear, left, and right of a vehicle to photograph images around the vehicle. The multiple fisheye lenses 102 separately convert the photographed images into fisheye image data and save the fisheye image data in the cache 104. The data display apparatus 106 displays the image data as an image, for example, displays the fisheye image data converted by the fisheye lens 102 as the image photographed by the fisheye lens 102.

A mounting position of each fisheye lens 102 on four sides, namely, the front, rear, left, and right, of the vehicle is corrected, as shown in FIG. 2A, which is a schematic diagram of a photographing angle of a fisheye lens of the present invention, and FIG. 2B, which is an icon of a photographed image of a fisheye lens of the present invention. The mounting position of each fisheye lens 102 is corrected by displaying, by the data display apparatus 106, the image of FIG. 2B, so that in the image photographed by each fisheye lens 102, an image of a vehicle bottom is located at one eighth of the bottom of the whole image.

When a static three-dimensional image stitching procedure is carried out, as shown in FIG. 3A and FIG. 3B, which are schematic diagrams of a correction plate of the present invention, each fisheye lens 102 photographs a correction plate 132, 134 around a vehicle 130. The correction plate 132 of FIG. 3A is used as an example, in which each fisheye lens 102 photographs scenery having one horizontal reference line 136 presented as a straight line and one radiate vertical reference line 138 presented as a straight line. The correction plate 134 of FIG. 3B is used as an example, each fisheye lens 102 photographs scenery having multiple horizontal reference lines 140 presented as straight lines and multiple radiate vertical reference lines 142 presented as straight lines. The correction plate 134 of FIG. 3B is used as example for describing the following embodiments of the present invention.

The fisheye images obtained by each fisheye lens 102 by photographing the correction plate 134 of FIG. 3B are an image of multiple horizontal reference lines 144 presented as circular arc lines (as shown in FIG. 4A, which is a schematic diagram of a fisheye image of horizontal reference lines of the present invention) and an image of multiple radiate vertical reference lines 146 presented as circular arc lines (shown in FIG. 5, which s a schematic diagram of a fisheye image of radiate vertical reference lines of the present invention) and the images of the horizontal reference lines 144 presented as circular arc lines and radiate vertical reference lines 146 presented as circular arc lines are converted into fisheye image data. Each fisheye lens 102 saves multiple pieces of fisheye image data in the cache 104.

The camera mounting correction module 112 receives the multiple pieces of fisheye image data (fisheye image data of the multiple horizontal reference lines 144 presented as circular arc lines and the multiple radiate vertical reference lines 146 presented as circular arc lines) or reads the multiple pieces of fisheye image data in the cache 104.

FIG. 4B is a schematic diagram of one horizontal reference line among the multiple horizontal reference lines of FIG. 4A. The camera mounting correction module 112 makes heights h1 and h2 of two end points of the horizontal reference line 144 be the same according to heights h1 and h2 of two end points of the horizontal reference line 144 in FIG. 4B, so as to adjust a horizontal position of each fisheye lens 102 to present a horizontal state.

The camera mounting correction module 112 adjusts a left and right angular position of each fisheye lens 102 according to the radiate vertical reference lines 146 presented as circular arc lines, so as to enable two ends, namely, left and right ends, of each fisheye lens 102 to photograph radiate vertical reference lines 142 of the correction plate 134.

Figures 6A, 6B:
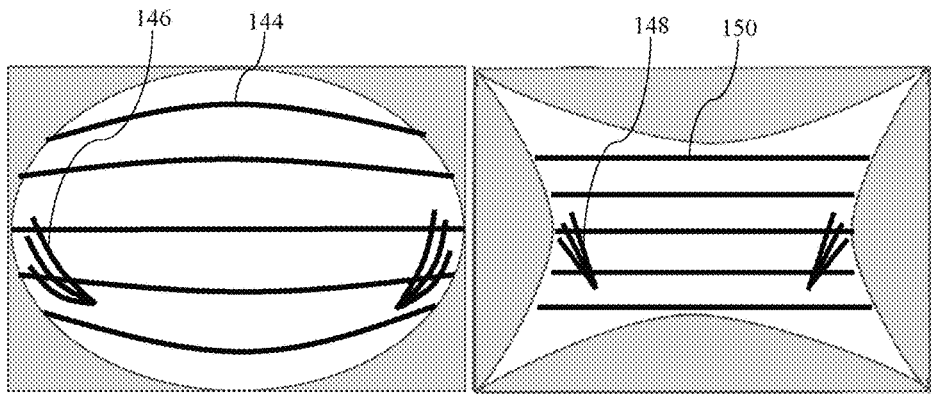
FIG. 6A is a schematic diagram of a fisheye image obtained by photographing a correction plate of the present invention.
FIG. 6B is a schematic diagram of a corrected image obtained by correcting the fisheye image of FIG. 6A.
Figures 6C, 6D:
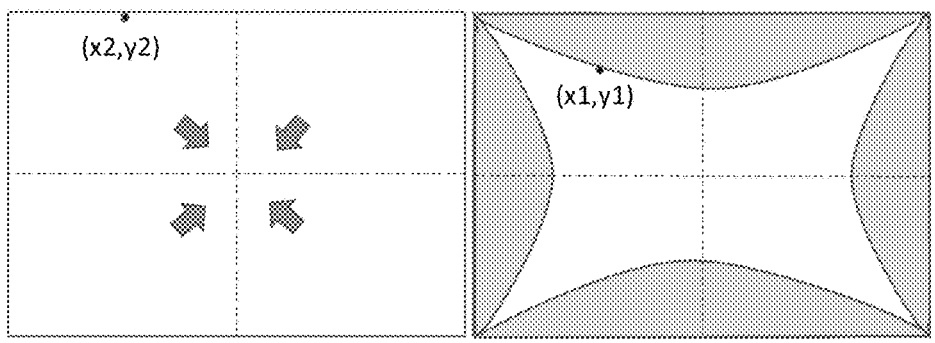
FIG. 6C is a schematic diagram of a coordinate position of a pixel in the fisheye image of FIG. 6A.
FIG. 6D is a schematic diagram of a coordinate position of a pixel, corresponding to the pixel in the fisheye image in FIG. 6C, in a corrected image.

FIG. 6A is a schematic diagram of a fisheye image obtained by photographing a correction plate of the present invention, FIG. 6B is a schematic diagram of a corrected image obtained by correcting the fisheye image of FIG. 6A, FIG. 6C is a schematic diagram of a coordinate position of a pixel in the fisheye image of FIG. 6A, and FIG. 6D is a schematic diagram of a coordinate position of a pixel, corresponding to the pixel in the fisheye image in FIG. 6C, in a corrected image.

The fisheye image obtained by each fisheye lens 102 by photographing the correction plate 134 of FIG. 3B is shown in FIG. 6A, and the horizontal reference lines 144 and the radiate vertical reference lines 146 in the fisheye image are presented as circular arc lines because of the fisheye lens 102. The fisheye lens 102 converts the fisheye image, as shown in FIG. 6A, into fisheye image data and saves the fisheye image data in the cache 104.

The fisheye image correction setting module 114 receives the fisheye image data converted by each fisheye lens 102 by using the image input and output module 110 or reads the fisheye image data in the cache 104. The fisheye image correction setting module 114 corrects the horizontal reference lines 144 presented as circular arc lines and the radiate vertical reference lines 146 presented as circular arc lines in FIG. 6A by using a known image correcting technology into the horizontal reference lines 148 presented as straight lines and the radiate vertical reference lines 150 presented as straight lines in FIG. 6B.

The horizontal reference lines 140 and the radiate vertical reference lines 142 of the correction plate 134 are recovered from circular arc lines into straight lines, which represents that a fisheye image correcting procedure is completed. In brief, the fisheye image correcting procedure mainly includes determining a group of most suitable elliptical arc parameters separately on X and Y axes of the fisheye image and then compressing all the pixels in the fisheye image data to a central point of the image according to the parameters, a shown in FIG. 6C and FIG. 6D. Assuming that FIG. 6C is a fisheye image, the corrected image of FIG. 6D is obtained after the fisheye image correcting procedure. Therefore, coordinates (x1, y1) of a pixel in the corrected image data of the corrected image of FIG. 6D corresponds to coordinates (x2, y2) of the fisheye image data of the fisheye image of FIG. 6C.

When performing fisheye image correction, the fisheye image correction setting module 114 generates a fisheye correction lookup table, and the fisheye correction lookup table mainly helps to find coordinates (x2, y2) of each pixel, corresponding to coordinates (x1, y1) of each pixel in the corrected image data after the fisheye image correction, in the fisheye image data. Therefore, there are basically at least two fisheye correction lookup tables, namely, "an X coordinate" fisheye correction lookup table and "a Y coordinate" fisheye correction lookup table.

Figure 7A:
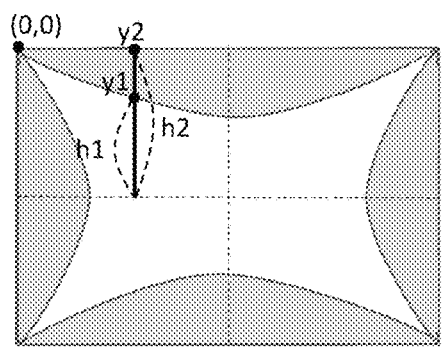
FIG. 7A and FIG. 7B are schematic diagrams of establishing a fisheye correction lookup table of the present invention.
Figure 7B:
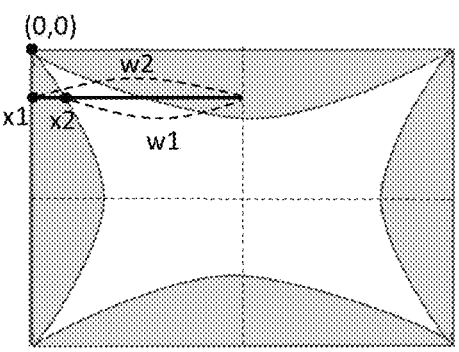

FIG. 7A and FIG. 7B are schematic diagrams of establishing a fisheye correction lookup table of the present invention. In FIG. 7A and FIG. 7B, coordinates (x1, y1) of a black bold line indicate a coordinate position of a pixel in the corrected image data, and coordinates (x2, y2) indicate a coordinate position of a pixel in the fisheye image data, where x2 and y2 are unknown values.

In FIG. 7A, h1 and h2 respectively represent height values from Y coordinate points y1 and y2 to a central line of an image. According to an equal ratio principle, a formula (1) can be obtained, and by means of deduction, a formula (2) can be obtained. In other words, y2 is a value of corresponding coordinates (x1, y1) in the "Y coordinate fisheye correction lookup table".

$$\frac{h1}{h2} = \frac{h2 - y1}{h2 - y2} \quad (1)$$

$$y2 = \frac{h2^2 - h1 * h2 - h2 * y1}{h1} \quad (2)$$

By using the same method (as shown in FIG. 7B), it could be deduced that x2 is a value of corresponding coordinates (x1, y1) in the "X coordinate fisheye correction lookup table" by means of formula (3), where w1 and w2 respectively present width values from X coordinate points x1 and x2 to a central line of the image.

$$x2 = \frac{w1 * w2 - w2^2 + w2 * x1}{w1} \quad (3)$$

After the fisheye image correction setting module 114 corrects the fisheye image into the corrected image, the fisheye image correction setting module 114 adjusts radiation angles of radiate vertical reference lines 150 in neighboring corrected images to be the same and enables the neighboring corrected images to overlap, and a rotation and translation lookup table is generated in a process of rotating and translating the corrected image.

Figure 8A:
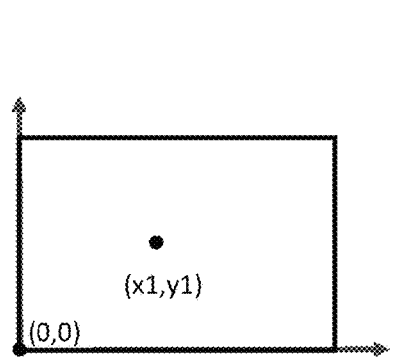
FIG. 8A and FIG. 8B are schematic diagrams of establishing a rotation and translation lookup table of the present invention.
Figure 8B:
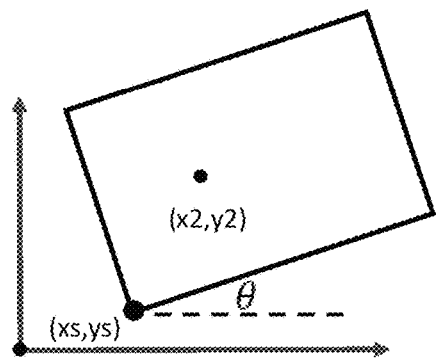

FIG. 8A and FIG. 8B are schematic diagrams of establishing a rotation and translation lookup table of the present invention. An origin (0, 0) of the corrected image in FIG. 8A is located at the lower left corner of the image, the corrected image is translated to a position of new coordinates (xs, ys) and is rotated counterclockwise by an angle θ with (xs, ys) as an origin, as shown in FIG. 8B. To obtain a relationship between coordinates (x2, y2) of a pixel in the corrected image data after the rotation and translation and coordinates (x1, y1) of a pixel in the original corrected image data, formulas (4) and (5) may be used, and meanwhile, there are two different rotation and translation lookup tables, namely, an "X coordinate" rotation and translation lookup table and a "Y coordinate" rotation and translation lookup table. In other words, a position relationship between a coordinate position of each pixel in the corrected image data after the rotation and translation and a coordinate position of each pixel in the original corrected image data can be acquired according to the two rotation and translation lookup tables, namely, the "X coordinate" rotation and translation lookup table and the "Y coordinate" rotation and translation lookup table.

$$x2=(x1-xs)\cos\theta+(y1-ys)\sin\theta \quad (4)$$

$$y2=-(x1-xs)\sin\theta+(y1-ys)\cos\theta \quad (5)$$

Figure 9:
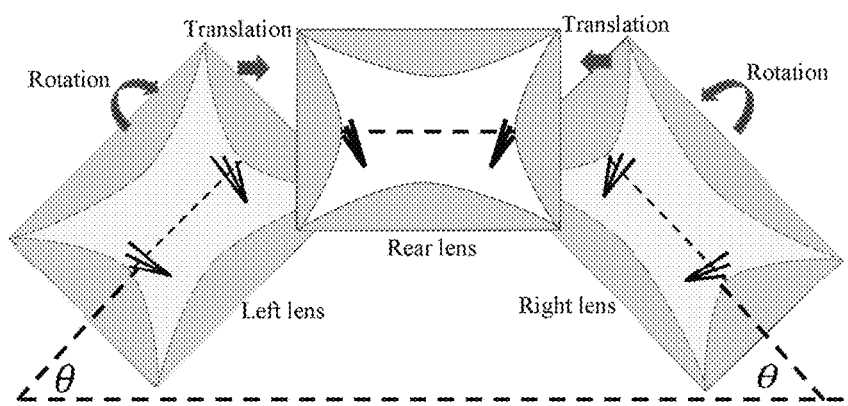
FIG. 9 is a schematic diagram of overlapping neighboring corrected images by using radiate vertical reference lines of the present invention.

The fisheye image correction setting module 114 enables, according to "radiate vertical reference lines" in two neighboring corrected images (for example, a left corrected image and a rear corrected image or a right corrected image and a rear corrected image), "radiate vertical reference lines" in two overlapped neighboring corrected images to overlap each other as much as possible by, as aforementioned, rotating and translating a coordinate position of each pixel in the corrected images on the left and right sides (as shown in FIG. 9, which is a schematic diagram of overlapping neighboring corrected images by using radiate vertical reference lines of the present invention). In this embodiment, a rotation angle θ of the corrected images on the left and right sides, preferably, falls within a range of 5°≤θ≤45°, and the rotation angle of this embodiment is obviously different from a known large rotation angle (greater than 65°).

When image overlapping is performed on the two neighboring corrected images, the static three-dimensional stitched image generation module 116 generates a stitched image lookup table according to the fisheye correction lookup tables and the rotation and translation lookup tables. When the static three-dimensional stitched image generation module 116 performs image stitching on the corrected images shown in FIG. 9, the static three-dimensional stitched image generation module 116 acquires, according to the stitched image lookup table, a coordinate position of each pixel, corresponding to each pixel in each piece of fisheye image data, in each piece of corrected image data on which image stitching is about to be performed.

Figure 10A:
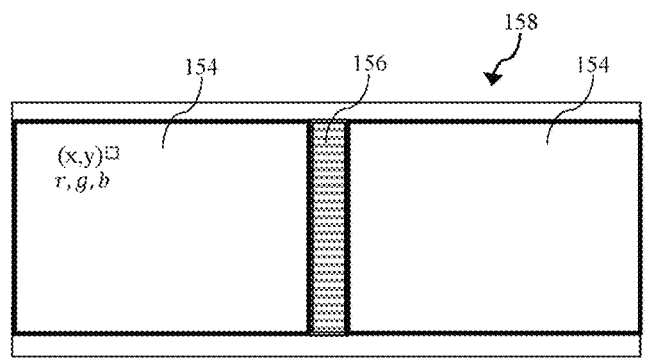
FIG. 10A is a schematic diagram of calculating a pixel value of an image non-overlapping region in a stitched image of the present invention.
Figure 10B:
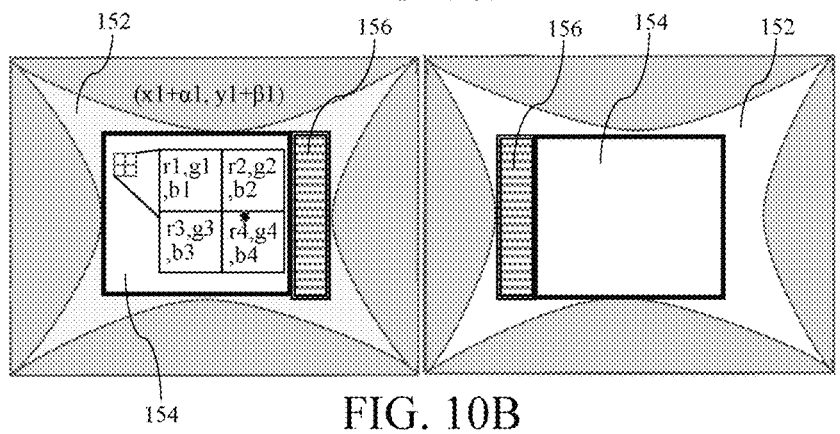
FIG. 10B is a schematic diagram of calculating a pixel value of an image non-overlapping region in an unstitched image of the present invention.
Figure 11A:
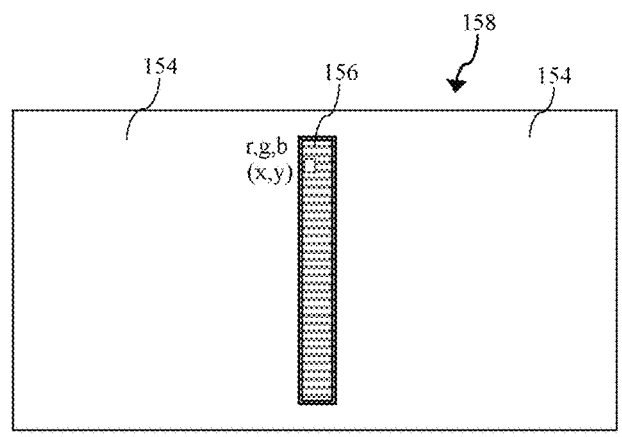
FIG. 11A is a schematic diagram of calculating a pixel value of an image overlapping region in a stitched image of the present invention.
Figure 11B:
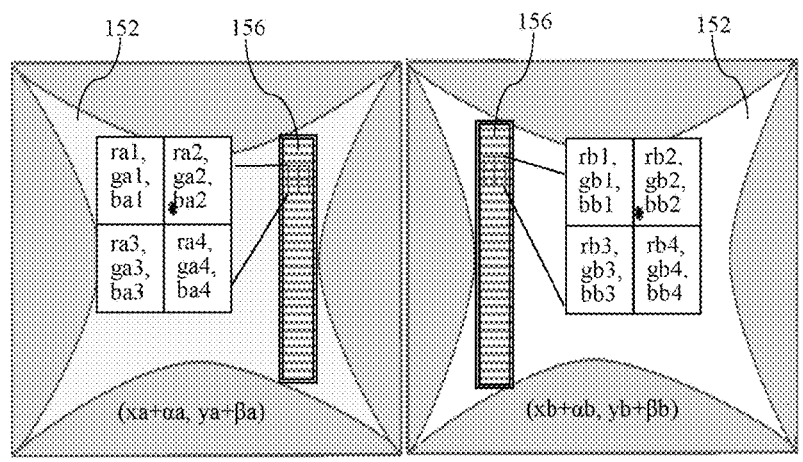
FIG. 11B is a schematic diagram of calculating a pixel value of an image overlapping region in an unstitched image of the present invention.

FIG. 10A is a schematic diagram of calculating a pixel value of an image non-overlapping region in a stitched image of the present invention, FIG. 10B is a schematic diagram of calculating a pixel value of an image non-overlapping region in an unstitched image of the present invention, FIG. 11A is a schematic diagram of calculating a pixel value of an image overlapping region in a stitched image of the present invention, and FIG. 11B is a schematic diagram of calculating a pixel value of an image overlapping region in an unstitched image of the present invention. Each corrected image 152 has an image non-overlapping region 154 and an image overlapping region 156 by default, shown in FIG. 10B and FIG. 11B.

A manner in which the static three-dimensional stitched image generation module 116 generates a static three-dimensional stitched image is basically, according a position of a pixel in a stitched image 158 of FIG. 10A and FIG. 11A, separately calculating a pixel value (namely, a pixel value of r (red), g (green), and b (blue)) of each pixel in the image non-overlapping region 154 and image overlapping region 156 of each piece of corrected image data.

The static three-dimensional stitched image generation module 116 calculates a pixel value of a pixel of the corrected image data of the stitched image 158 in the image non-overlapping region 154, and the calculation only needs to refer to one corrected image. Therefore, a coordinate position of a pixel, corresponding to a pixel in the fisheye image, of the corrected image 152 in the image non-overlapping region 154 is found according to the stitched image lookup table, and further, a pixel value of the pixel of the stitched image data of the stitched image 158 in the image non-overlapping region 154 can be obtained according to a pixel value of the corresponding coordinate position (as shown in FIG. 10A).

Assuming that a pixel value (r, g, b) of coordinates (x, y) of a pixel in the image non-overlapping region 154 in the stitched image 158 of FIG. 10A needs to be obtained, a coordinate position, corresponding to the coordinates (x, y) of the pixel in the stitched image 158, of the pixel in the fisheye image is found according to the stitched image lookup table to be (x1+α1, y1+β1), as shown in FIG. 10B, and numerical values of weighted values α1 and β1 are that 0≤α1<1 and 0≤β1<1. Pixel values of coordinates (x1, y1), (x1+1, y1), (x1, y1+1), and (x1+1, y1+1) of four pixels in the fisheye image would be used when the static three-dimensional stitched image generation module 116 calculates the pixel value of the coordinates (x, y) of the pixel of the stitched image, and may be obtained by using formulas (6), (7), and (8).

$$r=r1(1-\alpha1)(1-\beta1)+r2\alpha1(1-\beta1)+r3(1-\alpha1)\beta1+r4\alpha1\beta1 \quad (6)$$

$$g=g1(1-\alpha1)(1-\beta1)+g2\alpha1(1-\beta1)+g3(1-\alpha1)\beta1+g4\alpha1\beta1 \quad (7)$$

$$b=b1(1-\alpha1)(1-\beta1)+b2\alpha1(1-\beta1)+b3(1-\alpha1)\beta1+b4\alpha1\beta1 \quad (8)$$

The static three-dimensional stitched image generation module 116 calculates a pixel value of a pixel of the stitched image 158 in the image overlapping region 156, and the calculation only needs to refer to two corrected images (shown in FIG. 11B). Therefore, a coordinate position of a pixel, corresponding to a pixel in the fisheye image, of two to-be-stitched corrected images 152 in the image overlapping region 156 is found according to the stitched image lookup table, and further, a pixel value of the pixel of the stitched image data of the stitched image 158 in the image overlapping region 156 can be obtained according to a pixel value of the corresponding coordinate position (as shown in FIG. 11A).

Assuming that a pixel value (r, g, b) of coordinates (x, y) of a pixel in the image overlapping region 156 in the stitched image 158 of FIG. 11A needs to be obtained, a coordinate position of a pixel, corresponding to the pixel of the stitched image data of FIG. 11A in the image overlapping region 156, in the fisheye image data is found according to stitched image lookup table, and a pixel value of the pixel corresponding to the coordinate position can be acquired by finding the coordinate position of the pixel in the fisheye image data. Pixel values of a pixel in two pieces of fisheye image data need to be referred to (as shown in FIG. 11B) and pixel values (ra, ga, ba) and (rb, gb, bb) corresponding to the pixel in the two pieces of fisheye image data are separately obtained by using formulas (6) to (8).

When image stitching of the stitched image 158 is performed at a pixel in the image overlapping region 156, a pixel value of the pixel may be obtained by using formulas (9) to (11).

$$r=0.5*ra+0.5*rb \quad (9)$$

$$g=0.5*ga+0.5*gb \quad (10)$$

$$b=0.5*ba+0.5*bb \quad (11)$$

The static three-dimensional stitched image generation module 116 calculates pixel values of pixels of the stitched image 158 in the image non-overlapping region 154 and image overlapping region 156, so as to complete a static three-dimensional stitched image formed by correcting, rotating, and translating multiple fisheye images, and may generate a stitched image lookup table for use of dynamic three-dimensional image stitching in the following.

When a dynamic three-dimensional image stitching procedure is carried out, each fisheye lens 102 photographs scenery when the vehicle is traveling to obtain a fisheye image, the fisheye lens 102 converts the photographed fisheye image into fisheye image data and saves the fisheye image data in the cache 104.

The characteristic capturing module 118 receives the fisheye image data converted by each fisheye lens 102 by using the image input and output module 110 or reads the fisheye image data in the cache 104. The characteristic capturing module 118 performs dynamic three-dimensional image stitching by referring to multiple fisheye images and acquires, according to the foregoing stitched image lookup table, a coordinate position of each pixel, corresponding to each pixel in multiple pieces of fisheye image data, in a piece of dynamic stitched image data of a dynamic stitched image.

Figure 12:
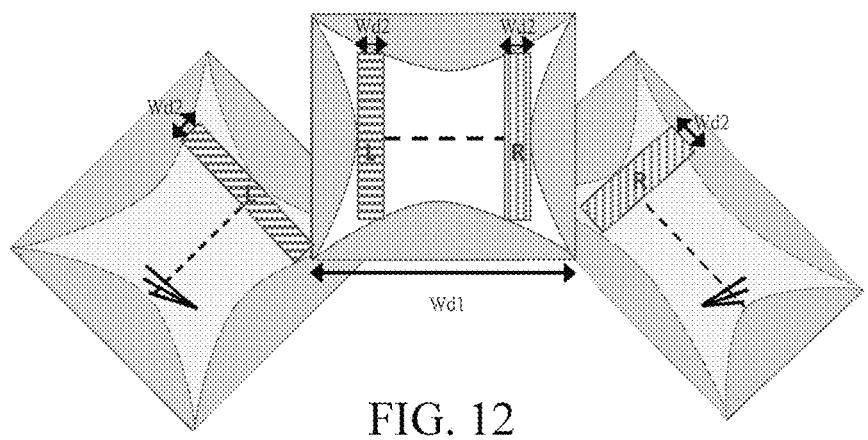
FIG. 12 is a schematic diagram of determining a width of an image overlapping region of an image of the present invention.

With regard to an image overlapping region of two neighboring fisheye images (for example, regions L and R in FIG. 12, which is a schematic diagram of determining a width of an image overlapping region of an image of the present invention, a "Edge Style Classification Map" (ESCM)" is obtained by analyzing an "edge direction" and a "gradient intensity". In this embodiment, if a width Wd2 of the image overlapping region (regions marked as L and R in FIG. 12) and a width Wd1 of the fisheye image satisfy a relationship of formula 12, a most optimal result can be achieved by using fewest operations.

$$\frac{1}{10}Wd1 \leq Wd2 \leq \frac{3}{10}Wd1 \quad (12)$$

The characteristic capturing module 118 calculates a horizontal gradient absolute value, a vertical gradient absolute value, and an edge direction value of each pixel of an image overlapping region of fisheye image data and compares the horizontal gradient absolute value, the vertical gradient absolute value, and the edge direction value of each pixel of the image overlapping region of the fisheye image data with a plurality of thresholds, so as to classify each pixel of the image overlapping region of the fisheye image data into one of a plurality of edge styles.

That is, capturing, by the characteristic capturing module 118, a characteristic from the fisheye image data is mainly capturing a gradient characteristic of each pixel of the image overlapping region of the fisheye image data. In a relatively complex fisheye image (for example, including a vehicle, a shadow, an artifact, and the like), excessive edge pixels would be detected and increase difficulty in subsequent characteristic comparison. In view of this, in this embodiment, pixels of the image overlapping region of the fisheye image data can be efficiently classified into at least four "edge styles" according to the characteristics thereof by using an "edge style classification map". A classification formula of the ESCM is as follows:

$$ES(x, y) = \begin{cases} 0 \text{ (No edge)}, & \text{if } (\text{Max}(\Delta AHG(x, y), \Delta AVG(x, y)) < Th_{E1}) \\ 1 \text{ (Horizontal edge)}, & \text{else if } (HdV(x, y) < Th_{E2}) \\ 2 \text{ (Oblique angle edge)}, & \text{else if } (HdV(x, y) < Th_{E3}) \\ 3 \text{ (Vertical edge)}, & \text{otherwise} \end{cases} \quad (13)$$

ES (x, y) is an "edge style" classification result of a point of a pixel coordinate position (x, y) of the image overlapping region of the fisheye image data; $\Delta AHG(x,y)$ and $\Delta AVG(x, y)$ are respectively a "horizontal gradient absolute value" and a "vertical gradient absolute value" of a pixel point (x, y), and value ranges are $0 \leq \Delta AHG(x,y) \leq 255$ and $0 \leq \Delta AVG(x, y) \leq 255$; HdV (x, y) is a value of $$\frac{AHG(x, y)}{AVG(x, y)},$$

and a range thereof is $0 \leq HdV(x, y) \leq \infty$; and $Th_{E1}$, $Th_{E2}$, and $Th_{E3}$ are respectively three types of thresholds. It is found upon multiple experiments that the following threshold settings can provide the most optimal result on a 3D-AVM application.

$$5 \leq Th_{E1} \leq 10 \quad (14)$$

$$0.3 \leq Th_{E2} \leq 0.7 \quad (15)$$

$$1.5 \leq Th_{E3} \leq 2.5 \quad (16)$$

Figure 13:
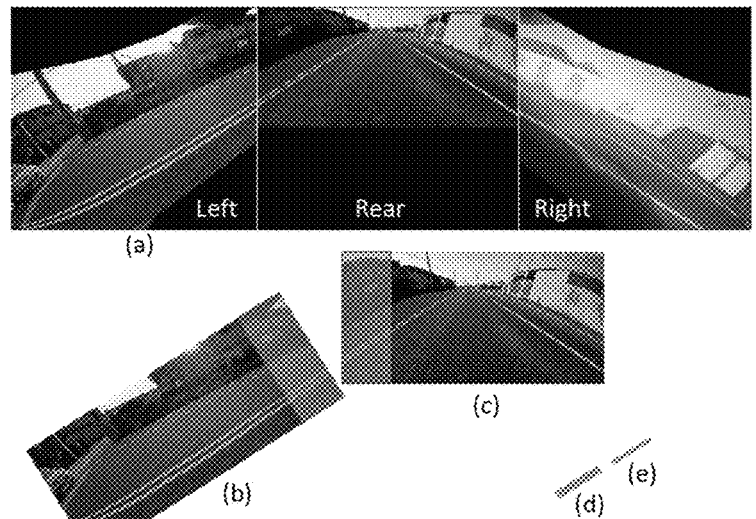
FIG. 13 is a diagram of not compressing and moving an image of the present invention.

FIG. 13 is a diagram of not compressing and moving an image of the present invention. After the characteristic capturing module 118 obtains the gradient characteristic in the image overlapping region of two neighboring images (for example, "a left image & a rear image" or "a right image & a rear image"), the characteristic capturing module 118 first finds an object (for example, a traffic lane line or a vehicle) in the image overlapping region, and then determines, according to sizes of the object in the two neighboring images, two important parameters that are dynamically adjusted: "a compressed image size proportion" and "an image moving degree".

During static image stitching, a phenomenon of inconsistency at an image stitching seam would be found, for example, in (a) of FIG. 13, an obvious inconsistency phenomenon occurs on the traffic lane lines on the road at the stitching seams between "a left image and a rear image" and between "a right image and a rear image", and in addition to that the traffic lane lines are not connected to each other, and thicknesses of the traffic lane lines are also obviously different.

In this embodiment, dynamic image adjustment is performed to resolve the foregoing problem. First, the dynamic parameter adjustment module 120 finds a corresponding object from a image overlapping region of neighboring images and determines a proportion of compressing one image of the neighboring images. For example, (b) and (c) of FIG. 13 are respective a left image and a rear image of (a) of FIG. 13, and "an image light white" portion is "an image overlapping region". By means of the foregoing classification of gradient characteristics, a relatively representative object (for example, a straight line segment of a traffic lane line) in the image overlapping region of the neighboring images can be found, and a parameter of an image that needs size compression is determined by analyzing an average width (a thickness degree) of the straight line. For example, (d) and (e) of FIG. 13 are respectively diagrams of widths of traffic lane lines of (b) and (c) of FIG. 13.

It is assumed that, average widths (thicknesses) of the line segments of (d) and (e) of FIG. 13 are respectively 5 and 3 pixel widths. The dynamic parameter adjustment module 120 can determine that the parameter of the compressed image is 3/5=0.6, in other words, a size of the image of (b) of FIG. 13 needs to be compressed to a size of 0.6 times the original size, so that an image stitching result is relatively perfect.

Figure 14:
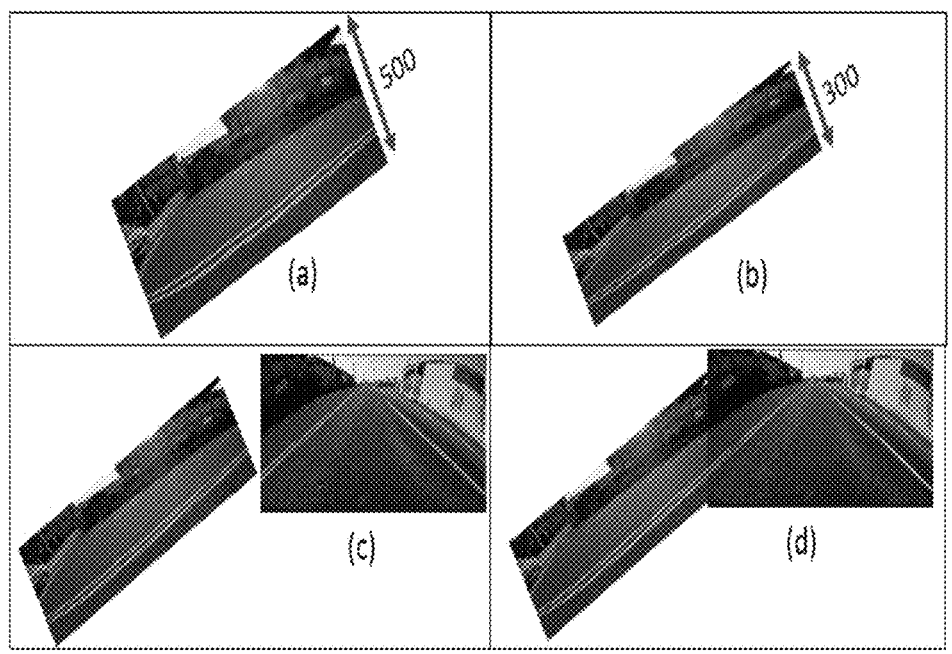
FIG. 14 is a diagram of compressing and moving an image of the present invention.

FIG. 14 is a diagram of compressing and moving an image of the present invention. After dynamic adjustment of a "compressed image size proportion" is performed, and a schematic diagram of moving an image to generate a stitched image is shown in FIG. 14. Assuming that a length of an original left image is 500 pixels (as shown in (a) of FIG. 14), and a compression proportion is set to 0.6, a length of a compressed image becomes 300 pixels (as shown in (b) of FIG. 14).

The (c) of FIG. 14 is a schematic diagram of "a left image" and "a rear image" before the images are moved, and a result after the images are moved is shown in (d) of FIG. 14. In this embodiment, when determining a reliable article in the image overlapping region, if the dynamic parameter adjustment module 120 finds one or more groups of objects at the same time, the dynamic parameter adjustment module 120 determines their importance according to positions of the objects and basically, a characteristic of an object at a bottom position is more important than a characteristic of an object at an up position.

The dynamic parameter adjustment module 120 performs edge detection on each pixel in multiple pieces of fisheye image data to obtain an average gradient absolute value intensity. For example, (a) and (b) of Table 1 are gradient characteristics of pixels of image data of partial images (a size of 7×7) in two fisheye images, and a bold underlined pixel at the center of (a) and (b) of Table 1 is a position of a current pixel on which an operation needs to be performed, and (a) and (b) of Table 1 are detected results after Sobel edge detection is performed on the pixel of the two pieces of image data. Assuming that a reference default region of the pixel on which operation is to be performed has a size of 5×5, the dynamic parameter adjustment module 120 obtains that "average gradient absolute value intensities", corresponding to the pixel on which operation is to be performed, in the two fisheye images are respectively ($M_a$=3600/25=144) and ($M_b$=360/25=14.4), as shown in (c) and (d) of Table 1, where (e) of Table 1 is a 3×3 mark numerical value of the Sobel edge detection.

TABLE 1

(a)

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 100 | 100 | <u>100</u> | 100 | 100 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

(b)

| 0 | 0 | 0 | 0 | 0 | 0 | 0 |
|---|---|---|---|---|---|---|
| 0 | 0 | 0 | 0 | 0 | 0 | 0 |

TABLE 1-continued

| 0 | 0 | 0 | 0 | 0 | 0 | 0 |
|---|---|---|---|---|---|---|
| 0 | 10 | 10 | <u>10</u> | 10 | 10 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

(c)

| 0 | 0 | 0 | 0 | 0 | 0 | 0 |
|---|---|---|---|---|---|---|
| 0 | 0 | 0 | 0 | 0 | 0 | 0 |
| 0 | 300 | 400 | 400 | 400 | 300 | 0 |
| 0 | 0 | 0 | <u>0</u> | 0 | 0 | 0 |
| 0 | −300 | −400 | −400 | −400 | −300 | 0 |
| 0 | 0 | 0 | 0 | 0 | 0 | 0 |
| 0 | 0 | 0 | 0 | 0 | 0 | 0 |

(d)

| 0 | 0 | 0 | 0 | 0 | 0 | 0 |
|---|---|---|---|---|---|---|
| 0 | 0 | 0 | 0 | 0 | 0 | 0 |
| 0 | 30 | 40 | 40 | 40 | 30 | 0 |
| 0 | 0 | 0 | <u>0</u> | 0 | 0 | 0 |
| 0 | −30 | −40 | −40 | −40 | −30 | 0 |
| 0 | 0 | 0 | 0 | 0 | 0 | 0 |
| 0 | 0 | 0 | 0 | 0 | 0 | 0 |

(e)

| −1 | −2 | −1 |
|---|---|---|
| 0 | 0 | 0 |
| 1 | 2 | 1 |

When dynamic three-dimensional image stitching is performed, the dynamic three-dimensional stitched image generation module 122 acquires, according to stitched image lookup table, a coordinate position of each pixel, corresponding to each pixel in each piece of fisheye image data, in dynamic stitched image data.

Figure 15A:
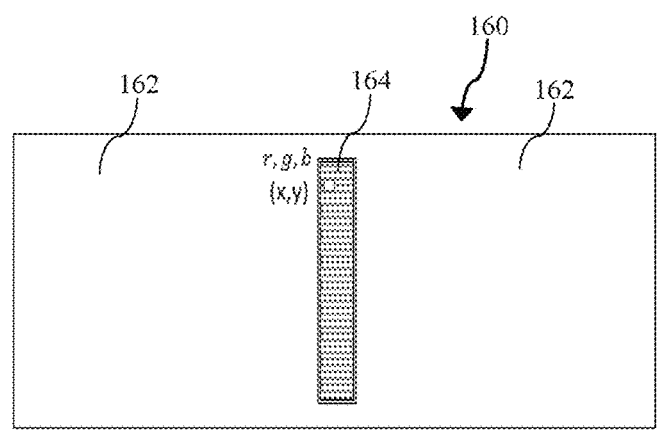
FIG. 15A is a schematic diagram of calculating a pixel value of a stitched image of the present invention.
Figure 15B:
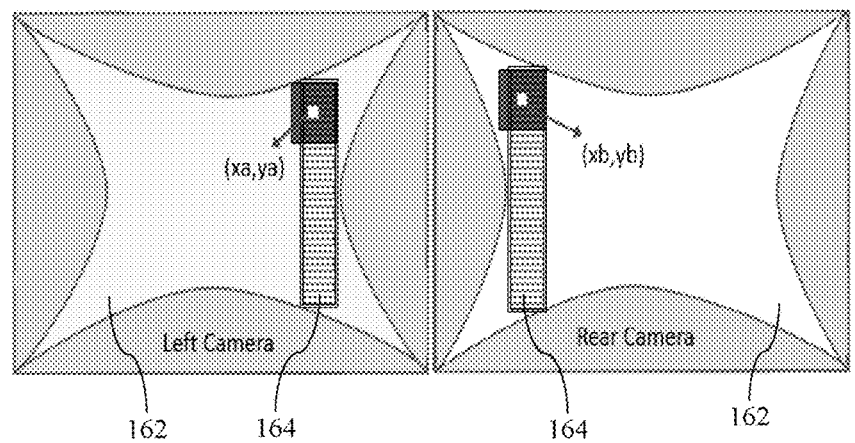
FIG. 15B is a schematic diagram of calculating a pixel value of an unstitched image of the present invention.

FIG. 15A is a schematic diagram of calculating a pixel value of a stitched image of the present invention, and FIG. 15B is a schematic diagram of calculating a pixel value of an unstitched image of the present invention. In FIG. 15A, a manner in which the dynamic three-dimensional stitched image generation module 122 calculates a pixel value of a pixel of the image data of a dynamic stitched image 160 in an image non-overlapping region 162 is the same as the foregoing manner in which the static three-dimensional stitched image generation module 116 calculates a pixel value of a pixel of the image data of the stitched image 158 in the image non-overlapping region 154, and the calculation only needs to refer to one fisheye image. Therefore, a coordinate position of a pixel, corresponding to a pixel in the fisheye image, of the dynamic stitched image 160 in the image non-overlapping region 162 is found according to the stitched image lookup table, and further, a pixel value of the pixel of the dynamic stitched image data of the dynamic stitched image 160 in the image non-overlapping region 162 can be obtained according to a pixel value of the corresponding coordinate position.

Assuming that a pixel value (r, g, b) of coordinates (x, y) of a pixel in an image overlapping region 164 in the dynamic stitched image 160 of FIG. 15A needs to be obtained, a coordinate position of a pixel, corresponding to the pixel of the dynamic stitched image data of FIG. 15A in the image overlapping region 164, in the fisheye image data is found according to stitched image lookup table, and a pixel value of the pixel corresponding to the coordinate position can be acquired by finding the coordinate position of the pixel in the fisheye image data. Pixel values of a pixel in two pieces of fisheye image data need to be referred to, and pixel values (ra, ga, ba) and (rb, gb, bb), respectively corresponding to the pixels (xa, ya) and (xb, yb) (as shown in FIG. 15B), in the two pieces of fisheye image data are separately obtained by using formulas (6) to (8).

The dynamic three-dimensional stitched image generation module 122 respectively obtains pixel values (ra, ga, ba) and (rb, gb, bb), corresponding to pixels (xa, ya) and (xb, yb) (as shown in FIG. 15B), in two pieces of fisheye image data and calculating a pixel value of a pixel of image data of the dynamic stitched image 160 in the image overlapping region 164 by using the pixel values (ra, ga, ba) and (rb, gb, bb), which can be performed by using formulas (17) to (19), where $$RatioM_a = \frac{M_a}{M_a + M_b},$$

and $$RatioM_b = \frac{M_b}{M_a + M_b};$$

and $M_a$ and $M_b$ are numerical values, corresponding to "average gradient absolute value intensities" around pixels (xa, ya) and (xb, yb) to be calculated, in the fisheye image data.

$$r = ra*RatioM_a + rb*RatioM_b \qquad (17)$$

$$g = ga*RatioM_a + gb*RatioM_b \qquad (18)$$

$$b = ba*RatioM_a + bb*RatioM_b \qquad (19)$$

Figure 16:
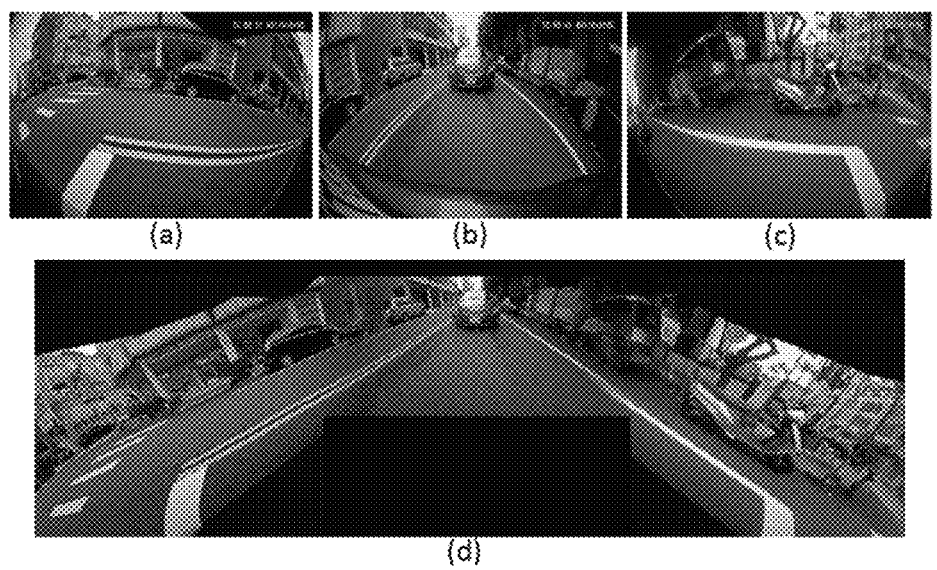
FIG. 16 is an icon of a three-dimensional image formed by stitching multiple images of the present invention.

FIG. 16 is an icon of a three-dimensional image formed by stitching multiple images of the present invention. The dynamic three-dimensional stitched image generation module 122 transmits the dynamic stitched image data (including image data of the image non-overlapping region and the image overlapping region dynamic stitched image) obtained by calculation to the data display apparatus 106 by using the image input and output module 110, and the data display apparatus 106 displays a dynamic three-dimensional stitched image (as shown in (d) of FIG. 16) formed by dynamically compressing and moving multiple fisheye images (as shown in (a), (b) and (c) in FIG. 16).

Operations of a three-dimensional around view monitoring method of a vehicle of the present invention are described by referring to the foregoing block diagram of the three-dimensional around view monitoring system of a vehicle and schematic diagrams related to the three-dimensional around view monitoring system of a vehicle.

Figure 17:
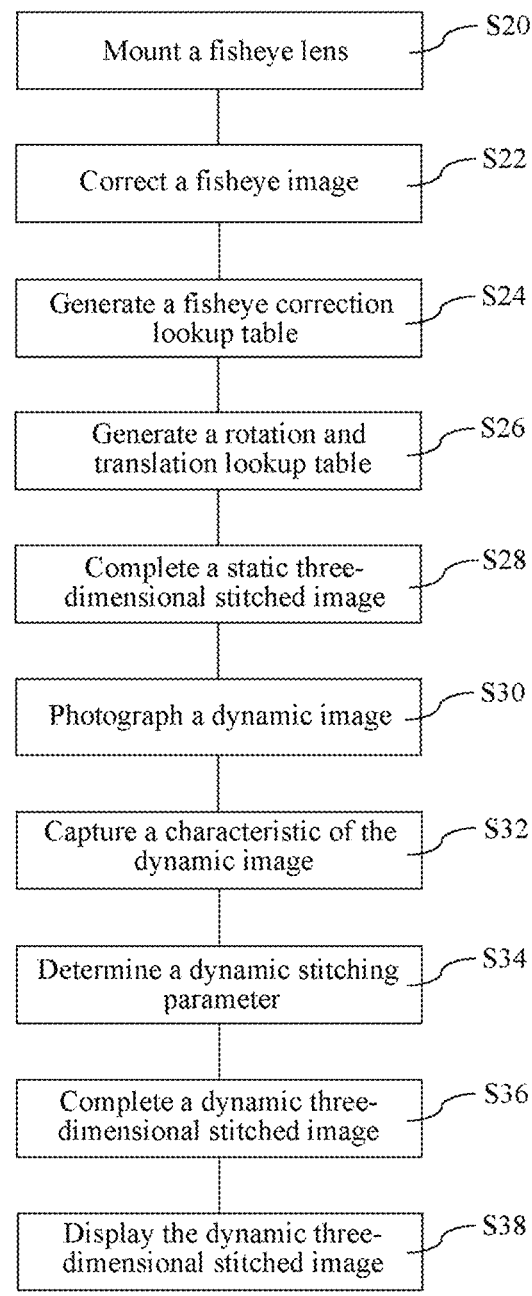
FIG. 17 is a flowchart of a three-dimensional around view monitoring method of a vehicle of the present invention.

FIG. 17 is a flowchart of a three-dimensional around view monitoring method of a vehicle of the present invention. In this embodiment, fisheye lenses 102 are respectively mounted on the front, rear, left, and right of a vehicle to photograph images around the vehicle (step S20). The multiple fisheye lenses 102 separately convert the photographed images into fisheye image data and save the fisheye image data in a cache 104.

A mounting position of each fisheye lens 102 on four sides, namely, the front, rear, left, and right, of the vehicle is corrected, as shown in FIG. 2A and FIG. 2B. The mounting position of each fisheye lens 102 is corrected by displaying, by a data display apparatus 106, the image of FIG. 2B, so that in the image photographed by each fisheye lens 102, an image of a vehicle bottom is located at one eighth of the bottom of the whole image.

When a static three-dimensional image stitching procedure is carried out, as shown in FIG. 3A and FIG. 3B, each fisheye lens 102 photographs a correction plate 132, 134 around a vehicle 130, and as shown in the correction plate 134 in FIG. 3B, each fisheye lens 102 photographs scenery having multiple horizontal reference lines 140 presented as straight lines and multiple radiate vertical reference lines 142 presented as straight lines.

The fisheye images obtained by each fisheye lens 102 by photographing the correction plate 134 are an image of multiple horizontal reference lines 144 presented as circular arc lines (as shown in FIG. 4A) and an image of multiple radiate vertical reference lines 146 presented as circular arc lines (shown in FIG. 5) and the images of the horizontal reference lines 144 presented as circular arc lines and radiate vertical reference lines 146 presented as circular arc lines are converted into fisheye image data. Each fisheye lens 102 saves multiple pieces of fisheye image data in the cache 104.

The camera mounting correction module 112 receives the multiple pieces of fisheye image data (fisheye image data of the multiple horizontal reference lines 144 presented as circular arc lines and the multiple radiate vertical reference lines 146 presented as circular arc lines) or reads the multiple pieces of fisheye image data in the cache 104.

The camera mounting correction module 112 makes heights h1 and h2 of two end points of the horizontal reference line 144 be the same according to heights h1 and h2 of two end points of the horizontal reference line 144 in FIG. 4B, so as to adjust a horizontal position of each fisheye lens 102 to present a horizontal state.

The camera mounting correction module 112 adjusts a left and right angular position of each fisheye lens 102 according to the radiate vertical reference lines 146 presented as circular arc lines, so as to enable two ends, namely, left and right ends, of each fisheye lens 102 to photograph radiate vertical reference lines 142 of the correction plate 134.

The fisheye image obtained by each fisheye lens 102 by photographing the correction plate 134 of FIG. 3B is shown in FIG. 6A, and the horizontal reference lines 144 and the radiate vertical reference lines 146 in the fisheye image are presented as circular arc lines because of the fisheye lens 102. The fisheye lens 102 converts the fisheye image, as shown in FIG. 6A, into fisheye image data and saves the fisheye image data in the cache 104.

The fisheye image correction setting module 114 receives the fisheye image data converted by each fisheye lens 102 by using the image input and output module 110 or reads the fisheye image data in the cache 104. The fisheye image correction setting module 114 corrects the horizontal reference lines 144 presented as circular arc lines and the radiate vertical reference lines 146 presented as circular arc lines in FIG. 6A by using a known image correcting technology into the horizontal reference lines 148 presented as straight lines and the radiate vertical reference lines 150 presented as straight lines in FIG. 6B (step S22).

The horizontal reference lines 140 and the radiate vertical reference lines 142 of the correction plate 134 are recovered from circular arc lines into straight lines, which represents that a fisheye image correcting procedure is completed. In brief, the fisheye image correcting procedure mainly includes determining a group of most suitable elliptical arc parameters separately on X and Y axes of the fisheye image and then compressing all the pixels in the fisheye image data to a central point of the image according to the parameters, a shown in FIG. 6C and FIG. 6D. Assuming that FIG. 6C is a fisheye image, the corrected image of FIG. 6D is obtained after the fisheye image correcting procedure. Therefore, coordinates (x1, y1) of a pixel in the corrected image data of the corrected image of FIG. 6D corresponds to coordinates (x2, y2) of the fisheye image data of the fisheye image of FIG. 6C.

When performing fisheye image correction, the fisheye image correction setting module 114 generates a fisheye correction lookup table (step S24), and the fisheye correction lookup table mainly helps to find coordinates (x2, y2) of each pixel, corresponding to coordinates (x1, y1) of each pixel in the corrected image data after the fisheye image correction, in the fisheye image data. Therefore, there are basically at least two fisheye correction lookup tables, namely, "an X coordinate" fisheye correction lookup table and "a Y coordinate" fisheye correction lookup table.

In FIG. 7A, h1 and h2 respectively represent height values from Y coordinate points y1 and y2 to a central line of an image. According to an equal ratio principle, a formula (1) can be obtained, and by means of deduction, a formula (2) can be obtained, so as to obtain that y2 is a value of corresponding coordinates (x1, y1) in the "Y coordinate fisheye correction lookup table". By using the same method (as shown in FIG. 7B), it could be deduced that x2 is a value of corresponding coordinates (x1, y1) in the "X coordinate fisheye correction lookup table" by means of formula (3).

After the fisheye image correction setting module 114 corrects the fisheye image into the corrected image, the fisheye image correction setting module 114 adjusts radiation angles of radiate vertical reference lines 150 in neighboring corrected images to be the same and enables the neighboring corrected images to overlap, and a rotation and translation lookup table is generated in a process of rotating and translating the corrected image (step S26).

An origin (0, 0) of the corrected image in FIG. 8A is located at the lower left corner of the image, the corrected image is translated to a position of new coordinates (xs, ys) and is rotated counterclockwise by an angle θ with (xs, ys) as an origin, as shown in FIG. 8B. To obtain a relationship between coordinates (x2, y2) of a pixel in the corrected image data after the rotation and translation and coordinates (x1, y1) of a pixel in the original corrected image data, formulas (4) and (5) may be used, and meanwhile, there are two different rotation and translation lookup tables, namely, an "X coordinate" rotation and translation lookup table and a "Y coordinate" rotation and translation lookup table. In other words, a position relationship between a coordinate position of each pixel in the corrected image data after the rotation and translation and a coordinate position of each pixel in the original corrected image data can be acquired according to the two rotation and translation lookup tables, namely, the "X coordinate" rotation and translation lookup table and the "Y coordinate" rotation and translation lookup table.

The fisheye image correction setting module 114 enables, according to "radiate vertical reference lines" in two neighboring corrected images (for example, a left corrected image and a rear corrected image or a right corrected image and a rear corrected image), "radiate vertical reference lines" in two overlapped neighboring corrected images to overlap each other as much as possible by, as aforementioned, rotating and translating a coordinate position of each pixel in the corrected images on the left and right sides (as shown in FIG. 9). In this embodiment, a rotation angle θ of the corrected images on the left and right sides, preferably, falls within a range of $5° \leq θ \leq 45°$.

When image overlapping is performed on the two neighboring corrected images, the static three-dimensional stitched image generation module 116 generates a stitched image lookup table according to the fisheye correction lookup tables and the rotation and translation lookup tables. When the static three-dimensional stitched image generation module 116 performs image stitching on the corrected images shown in FIG. 9, the static three-dimensional stitched image generation module 116 acquires, according to the stitched image lookup table, a coordinate position of each pixel, corresponding to each pixel in each piece of fisheye image data, in each piece of corrected image data on which image stitching is about to be performed.

According a position of a pixel in a stitched image 158 of FIG. 10A and FIG. 11A, the static three-dimensional stitched image generation module 116 separately calculates a pixel value (namely, a pixel value of r, g, and b) of each pixel in the image non-overlapping region 154 and image overlapping region 156 of each piece of corrected image data.

The static three-dimensional stitched image generation module 116 calculates a pixel value of a pixel of the corrected image data of the stitched image 158 in the image non-overlapping region 154, and the calculation only needs to refer to one corrected image.

Therefore, a coordinate position of a pixel, corresponding to a pixel in the fisheye image, of the corrected image 152 in the image non-overlapping region 154 is found according to the stitched image lookup table, and further, a pixel value of the pixel of the stitched image data of the stitched image 158 in the image non-overlapping region 154 can be obtained according to a pixel value of the corresponding coordinate position (as shown in FIG. 10A).

Assuming that a pixel value (r, g, b) of coordinates (x, y) of a pixel in the image non-overlapping region 154 in the stitched image 158 of FIG. 10A needs to be obtained, a coordinate position, corresponding to the coordinates (x, y) of the pixel in the stitched image 158, of the pixel in the fisheye image is found according to the stitched image lookup table to be (x1+α1, y1+(31), and numerical values of weighted values α1 and β1 are that $0 \leq α1 < 1$ and $0 \leq β1 < 1$. Pixel values of coordinates (x1, y1), (x1+1, y1), (x1, y1+1), and (x1+1, y1+1) of four pixels in the fisheye image would be used when the static three-dimensional stitched image generation module 116 calculates the pixel value of the coordinates (x, y) of the pixel of the stitched image, as shown in FIG. 10B, and may be obtained by using formulas (6), (7), and (8).

The static three-dimensional stitched image generation module 116 calculates a pixel value of a pixel of the stitched image 158 in the image overlapping region 156, and the calculation only needs to refer to two corrected images (shown in FIG. 11B). Therefore, a coordinate position of a pixel, corresponding to a pixel in the fisheye image, of two to-be-stitched corrected images 152 in the image overlapping region 156 is found according to the stitched image lookup table, and further, a pixel value of the pixel of the stitched image data of the stitched image 158 in the image overlapping region 156 can be obtained according to a pixel value of the corresponding coordinate position (as shown in FIG. 11A).

Assuming that a pixel value (r, g, b) of coordinates (x, y) of a pixel in the image overlapping region 156 in the stitched image 158 of FIG. 11A needs to be obtained, a coordinate position of a pixel, corresponding to the pixel of the stitched image data of FIG. 11A in the image overlapping region 156, in the fisheye image data is found according to stitched image lookup table, and a pixel value of the pixel corresponding to the coordinate position can be acquired by finding the coordinate position of the pixel in the fisheye image data. Pixel values of a pixel in two pieces of fisheye image data need to be referred to (as shown in FIG. 11B) and pixel values (ra, ga, ba) and (rb, gb, bb) corresponding to the pixel in the two pieces of fisheye image data are separately obtained by using formulas (6) to (8). When image stitching of the stitched image 158 is performed at a pixel in the image overlapping region 156, a pixel value of the pixel may be obtained by using formulas (9) to (11).

The static three-dimensional stitched image generation module 116 calculates pixel values of pixels of the stitched image 158 in the image non-overlapping region 154 and image overlapping region 156, so as to complete a static three-dimensional stitched image formed by correcting, rotating, and translating multiple fisheye images, and may generate a stitched image lookup table for use of dynamic three-dimensional image stitching in the following (step S28).

When a dynamic three-dimensional image stitching procedure is carried out, each fisheye lens 102 photographs scenery when the vehicle is traveling to obtain a fisheye image, the fisheye lens 102 converts the photographed fisheye image into fisheye image data and saves the fisheye image data in the cache 104 (step S30).

The characteristic capturing module 118 receives the fisheye image data converted by each fisheye lens 102 by using the image input and output module 110 or reads the fisheye image data in the cache 104. The characteristic capturing module 118 performs dynamic three-dimensional image stitching by referring to multiple fisheye images and acquires, according to the foregoing stitched image lookup table, a coordinate position of each pixel, corresponding to each pixel in multiple pieces of fisheye image data, in a piece of dynamic stitched image data of a dynamic stitched image.

With regard to an image overlapping region of two neighboring fisheye images (for example, regions L and R in FIG. 12), a "Edge Style Classification Map (ESCM)" is obtained by analyzing an "edge direction" and a "gradient intensity".

The characteristic capturing module 118 calculates a horizontal gradient absolute value, a vertical gradient absolute value, and an edge direction value of each pixel of an image overlapping region of fisheye image data and compares the horizontal gradient absolute value, the vertical gradient absolute value, and the edge direction value of each pixel of the image overlapping region of the fisheye image data with multiple thresholds, so as to classify each pixel of the image overlapping region of the fisheye image data into one of multiple edge styles (step S32).

That is, capturing, by the characteristic capturing module 118, a characteristic from the fisheye image data is mainly capturing a gradient characteristic of each pixel of the image overlapping region of the fisheye image data. In this embodiment, pixels of the image overlapping region of the fisheye image data can be efficiently classified into at least four "edge styles" according to the characteristics thereof by using an "edge style classification map".

After the characteristic capturing module 118 obtains the gradient characteristic in the image overlapping region of two neighboring images (for example, "a left image & a rear image" or "a right image & a rear image"), the characteristic capturing module 118 first finds an object (for example, a traffic lane line or a vehicle) in the image overlapping region, and then determines, according to sizes of the object in the two neighboring images, two important parameters that are dynamically adjusted: "a compressed image size proportion" and "an image moving degree" (step S34).

The dynamic parameter adjustment module 120 finds a corresponding object from a image overlapping region of neighboring images and determines a proportion of compressing one image of the neighboring images. For example, (b) and (c) of FIG. 13 are respective a left image and a rear image of (a) of FIG. 13, and "an image light white" portion is "an image overlapping region". By means of the foregoing classification of gradient characteristics, a relatively representative object (for example, a straight line segment of a traffic lane line) in the image overlapping region of the neighboring images can be found, and a parameter of an image that needs size compression is determined by analyzing an average width (a thickness degree) of the straight line. For example, (d) and (e) of FIG. 13 are respectively diagrams of widths of traffic lane lines of (b) and (c) of FIG. 13 and descriptions of the foregoing examples of average widths of line segments.

After dynamic adjustment of a "compressed image size proportion" is performed, and a schematic diagram of moving an image to generate a stitched image is shown in FIG. 14. Assuming that a length of an original left image is 500 pixels (as shown in (a) of FIG. 14), and a compression proportion is set to 0.6, a length of a compressed image becomes 300 pixels (as shown in (b) of FIG. 14).

The (c) of FIG. 14 is a schematic diagram of "a left image" and "a rear image" before the images are moved, and a result after the images are moved is shown in (d) of FIG. 14. In this embodiment, when determining a reliable article in the image overlapping region, if the dynamic parameter adjustment module 120 finds one or more groups of objects at the same time, the dynamic parameter adjustment module 120 determines their importance according to positions of the objects and basically, a characteristic of an object at a bottom position is more important than a characteristic of an object at an up position.

It is described in the preceding Table 1 that the dynamic parameter adjustment module 120 performs edge detection on each pixel in multiple pieces of fisheye image data to obtain an average gradient absolute value intensity.

When dynamic three-dimensional image stitching is performed, the dynamic three-dimensional stitched image generation module 122 acquires, according to stitched image lookup table, a coordinate position of each pixel, corresponding to each pixel in each piece of fisheye image data, in dynamic stitched image data.

In FIG. 15A, a manner in which the dynamic three-dimensional stitched image generation module 122 calculates a pixel value of a pixel of the image data of a dynamic stitched image 160 in an image non-overlapping region 162 is the same as the foregoing manner in which the static three-dimensional stitched image generation module 116 calculates a pixel value of a pixel of the image data of the stitched image 158 in the image non-overlapping region 154, and the calculation only needs to refer to one fisheye image. Therefore, a coordinate position of a pixel, corresponding to a pixel in the fisheye image, of the dynamic stitched image 160 in the image non-overlapping region 162 is found according to the stitched image lookup table, and further, a pixel value of the pixel of the dynamic stitched image data of the dynamic stitched image 160 in the image non-overlapping region 162 can be obtained according to a pixel value of the corresponding coordinate position.

Assuming that a pixel value (r, g, b) of coordinates (x, y) of a pixel in an image overlapping region 164 in the dynamic stitched image 160 of FIG. 15A needs to be obtained, a coordinate position of a pixel, corresponding to the pixel of the dynamic stitched image data of FIG. 15A in the image overlapping region 164, in the fisheye image data is found according to stitched image lookup table, and a pixel value of the pixel corresponding to the coordinate position can be acquired by finding the coordinate position of the pixel in the fisheye image data. Pixel values of a pixel in two pieces of fisheye image data need to be referred to, and pixel values (ra, ga, ba) and (rb, gb, bb), respectively corresponding to the pixels (xa, ya) and (xb, yb) (as shown in FIG. 15B), in the two pieces of fisheye image data are separately obtained by using formulas (6) to (8).

The dynamic three-dimensional stitched image generation module 122 respectively obtains pixel values (ra, ga, ba) and (rb, gb, bb), corresponding to pixels (xa, ya) and (xb, yb) (as shown in FIG. 15B), in two pieces of fisheye image data and calculating a pixel value of a pixel of image data of the dynamic stitched image 160 in the image overlapping region 164 by using the pixel values (ra, ga, ba) and (rb, gb, bb), which can be performed by using formulas (17) to (19) (step S36).

The dynamic three-dimensional stitched image generation module 122 transmits the dynamic stitched image data (including image data of the image non-overlapping region and the image overlapping region dynamic stitched image) obtained by calculation to the data display apparatus 106 by using the image input and output module 110, and the data display apparatus 106 displays a dynamic three-dimensional stitched image (as shown in (d) of FIG. 16) formed by dynamically compressing and moving multiple fisheye images (as shown in (a), (b) and (c) in FIG. 16) (step S38).

The present invention provides a three-dimensional around view monitoring system of a vehicle and a method thereof, of which a feature is reducing generation of a stitching blind angle during image stitching, so that an article that actually appears around the vehicle would not disappear at a region where images are stitched, and a situation that an article repeatedly appears would not take place.

Although the present invention is described as above by referring to preferred embodiments and illustrative accompanying drawings, the present invention should be not considered to be limitative. Various modifications, omissions, and changes made by persons skilled in the art on forms and embodiments of the present invention all fall within the scopes of the claims of the present invention.

What is claimed is:

1. A three-dimensional around view monitoring method of a vehicle, comprising the following steps:
   receiving a plurality of pieces of fisheye image data generated by photographing a correction plate, wherein the correction plate comprises a plurality of horizontal reference lines presented as straight lines and a plurality of radiate vertical reference lines presented as straight lines, and the horizontal reference lines and the radiate vertical reference lines are presented as circular arc lines in the pieces of fisheye image data;
   correcting the pieces of fisheye image data comprising the horizontal reference lines presented as circular arc lines and the radiate vertical reference lines presented as circular arc lines into a plurality of pieces of corrected image data comprising the horizontal reference lines presented as straight lines and the radiate vertical reference lines presented as straight lines to generate a fisheye correction lookup table, and acquiring a coordinate position of each pixel, corresponding to each pixel in the pieces of fisheye image data, in the pieces of corrected image data according to the fisheye correction lookup table;
   rotating and translating the radiate vertical reference lines presented as straight lines in the pieces of corrected image data in a neighborhood into overlaps having a same radiation angle to generate a rotation and translation lookup table and acquiring, according to the rotation and translation lookup table and the fisheye correction lookup table, a coordinate position of each pixel, corresponding to each pixel in the pieces of fisheye image data, in the pieces of corrected image data that have been rotated and translated; and
   generating a stitched image lookup table according to the rotation and translation lookup table and the fisheye correction lookup table, acquiring, according to the stitched image lookup table, a coordinate position of each pixel, corresponding to each pixel in the pieces of fisheye image data, in the pieces of corrected image data, calculating a pixel value of each pixel in the pieces of corrected image data by using the pixel value of each pixel in the pieces of fisheye image data, and performing image stitching on the neighboring pieces of corrected image data to generate a piece of static stitched image data.

2. The method according to claim 1, wherein the step of capturing an image of a correction plate comprises the following steps:
   adjusting mounting positions of the plurality of fisheye lenses to enable a place at one eighth of an image bottom of the pieces of fisheye image data generated by photographing, by the fisheye lenses, images is an image of a bottom of a vehicle;
   adjusting horizontal positions of the fisheye lenses according to heights of two end points of one of the horizontal reference lines presented as circular arc lines in the pieces of fisheye image data;
   adjusting each fisheye lens according to the radiate vertical reference lines presented as circular arc lines in the pieces of fisheye image data, so as to enable two ends, namely, left and right ends, of each fisheye lens to photograph the radiate vertical reference lines of the correction plate; and
   generating the pieces of fisheye image data from the images of the correction plate that are photographed by the fisheye lenses.

3. The method according to claim 1, wherein a rotation angle by which the radiate vertical reference lines presented as straight lines of the pieces of corrected image data are rotated ranges from 5° to 45°.

4. The method according to claim 1, wherein before the step of performing image stitching, the method comprises the following steps:
   acquiring, according to the stitched image lookup table, a coordinate position of each pixel, corresponding to each pixel in the pieces of fisheye image data, in a default image non-overlapping region and a default image overlapping region of each piece of the corrected image data;
   calculating, according to the pixel value of each pixel in the pieces of fisheye image data, a pixel value of each pixel of the image non-overlapping region of the corrected image data, so as to obtain a pixel vale of each pixel in the image non-overlapping region of the static stitched image data; and
   calculating, according to the pixel value of each pixel in the pieces of fisheye image data, a pixel value of each pixel of the image overlapping region in the pieces of corrected image data and calculating, according to the calculated pixel value, a pixel value of each pixel in the image overlapping region that performs image overlapping in the pieces of corrected image data, so as to obtain a pixel value of each pixel in the image overlapping region of the static stitched image data.

5. The method according to claim 1, after the step of generating a piece of static stitched image data, the method further comprises the following steps:
  receiving the pieces of data of fisheye images that are photographed when the vehicle is traveling;
  acquiring, according to the stitched image lookup table, a coordinate position of each pixel, corresponding to each pixel in the pieces of fisheye image data, in a piece of dynamic stitched image data;
  calculating a horizontal gradient absolute value, a vertical gradient absolute value, and an edge direction value of each pixel of an image overlapping region of the pieces of fisheye image data and comparing the horizontal gradient absolute value, the vertical gradient absolute value, and the edge direction value of each pixel of the image overlapping region of the pieces of fisheye image data with a plurality of thresholds, so as to classify each pixel of the image overlapping region of the pieces of fisheye image data into one of a plurality of edge styles;
  acquiring, according to an edge style of each pixel of the image overlapping region of the pieces of fisheye image data, a size of an object in the image overlapping region of the neighboring images to determine an image compressing size proportion parameter and an image moving degree parameter of the dynamic stitched image data, so as to compress and move an image of image data that is one of the neighboring images in the dynamic stitched image data;
  calculating, according to a pixel value of each pixel of an image non-overlapping region of the pieces of fisheye image data, a pixel value of each pixel of the image non-overlapping region of a piece of dynamic stitched image data; and
  multiplying the pixel value of each pixel of the image overlapping region of the image data of the neighboring images that is calculated according to the pixel value of each pixel of the image overlapping region of the pieces of fisheye image data by an average gradient absolute value intensity, so as to obtain a pixel value of each pixel of the image overlapping region of the dynamic stitched image data, wherein edge detection is performed on each pixel of the image overlapping region of the pieces of fisheye image data to obtain the average gradient absolute value intensity.

6. A three-dimensional around view monitoring system of a vehicle, comprising:
  a fisheye image correction setting module, configured to receive a plurality of pieces of fisheye image data generated by photographing a correction plate, correct the pieces of fisheye image data comprising a plurality of horizontal reference lines presented as circular arc lines and a plurality of radiate vertical reference lines presented as circular arc lines into a plurality of pieces of corrected image data comprising the horizontal reference lines presented as straight lines and the radiate vertical reference lines presented as straight lines to generate a fisheye correction lookup table, and rotate and translate the radiate vertical reference lines presented as straight lines in the pieces of corrected image data in a neighborhood into overlaps having a same radiation angle to generate a rotation and translation lookup table, wherein the correction plate comprises the horizontal reference lines presented as straight lines and the radiate vertical reference lines presented as straight lines, the horizontal reference lines and the radiate vertical reference lines are presented as circular arc lines in the pieces of fisheye image data, a coordinate position of each pixel, corresponding to each pixel in the pieces of fisheye image data, in the pieces of corrected image data is acquired according to the fisheye correction lookup table and a coordinate position of each pixel, corresponding to each pixel in the pieces of fisheye image data, in the pieces of corrected image data that have been rotated and translated is acquired according to the rotation and translation lookup table and the fisheye correction lookup table; and
a static three-dimensional stitched image generation module, configured to generate a stitched image lookup table according to the rotation and translation lookup table and the fisheye correction lookup table, calculate a pixel value of each pixel in the pieces of corrected image data by using the pixel value of each pixel in the pieces of fisheye image data, and perform image stitching on the neighboring pieces of corrected image data to generate a piece of static stitched image data, wherein a coordinate position of each pixel, corresponding to each pixel in the pieces of fisheye image data, in the pieces of corrected image data is acquired according to the stitched image lookup table.

7. The system according to claim 6, further comprising:
a camera mounting correction module, configured to adjust mounting positions of the plurality of fisheye lenses to enable a place at one eighth of an image bottom of the pieces of fisheye image data generated by photographing, by the fisheye lenses, images is an image of a bottom of a vehicle, adjust horizontal positions of the fisheye lenses according to heights of two end points of one of the horizontal reference lines presented as circular arc lines in the pieces of fisheye image data, and adjust each fisheye lens according to the radiate vertical reference lines presented as circular arc lines in the pieces of fisheye image data, so as to enable two ends, namely, left and right ends, of each fisheye lens to photograph the radiate vertical reference lines of the correction plate; and
an image input and output module, wherein the camera mounting correction module and the fisheye image correction setting module receives, by using the image input and output module, the pieces of fisheye image data transmitted by the fisheye lenses, and the static three-dimensional stitched image generation module transmits the static stitched image data to a data display apparatus by using the image input and output module.

8. The system according to claim 7, further comprising:
a characteristic capturing module, configured to receive the pieces of data of fisheye images that are photographed when the vehicle is traveling, calculate a horizontal gradient absolute value, a vertical gradient absolute value, and an edge direction value of each pixel of an image overlapping region of the pieces of fisheye image data and compare the horizontal gradient absolute value, the vertical gradient absolute value, and the edge direction value of each pixel of the image overlapping region of the pieces of fisheye image data with a plurality of thresholds, so as to classify each pixel of the image overlapping region of the pieces of fisheye image data into one of a plurality of edge styles;

a dynamic parameter adjustment module, configured to acquire, according to an edge style of each pixel of the image overlapping region of the pieces of fisheye image data, a size of an object in the image overlapping region of the neighboring images to determine an image compressing size proportion parameter and an image moving degree parameter of the dynamic stitched image data, and perform edge detection on each pixel of the image overlapping region of the pieces of fisheye image data to obtain an average gradient absolute value intensity; and a dynamic three-dimensional stitched image generation module, configured to compress and move an image of image data that is one of the neighboring images according to the image compressing size proportion parameter and the image moving degree parameter, calculate, according to a pixel value of each pixel of an image non-overlapping region of the pieces of fisheye image data, a pixel value of each pixel of the image non-overlapping region of the dynamic stitched image data; and multiply the pixel value of each pixel of the image overlapping region of the image data of the neighboring images that is calculated according to the pixel value of each pixel of the image overlapping region of the pieces of fisheye image data by an average gradient absolute value intensity, so as to obtain a pixel value of each pixel of the image overlapping region of the dynamic stitched image data.

9. The system according to claim 6, wherein a rotation angle by which the fisheye image correction setting module rotates the radiate vertical reference lines presented as straight lines of the pieces of corrected image data ranges from 5° to 45°.

10. The system according to claim 6, wherein the static three-dimensional stitched image generation module implements the following functions:

acquiring, according to the stitched image lookup table, a coordinate position of each pixel, corresponding to each pixel in the pieces of fisheye image data, in a default image non-overlapping region and a default image overlapping region of each piece of the corrected image data;

calculating a pixel value, corresponding to the pixel value of each pixel of the image non-overlapping region, of each pixel in the pieces of fisheye image data, so as to obtain a pixel vale of each pixel in the image non-overlapping region of the stitched image data; and calculating a pixel value, corresponding to the pixel value of each pixel in the pieces of fisheye image data, of each pixel of the image overlapping region in the pieces of corrected image data and calculating, according to the calculated pixel value, a pixel value of each pixel in the image overlapping region that performs image overlapping in the pieces of corrected image data, so as to obtain a pixel value of each pixel in the image overlapping region of the stitched image data.

* * * * *